United States Patent
Nguyen et al.

(10) Patent No.: US 12,372,601 B2
(45) Date of Patent: Jul. 29, 2025

(54) METHOD FOR GEOLOCATING INTERFERENCE SOURCE IN COMMUNICATION-BASED TRANSPORT SYSTEM

(71) Applicant: Mitsubishi Electric Corporation, Tokyo (JP)

(72) Inventors: Viet Hoa Nguyen, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 533 days.

(21) Appl. No.: 17/918,695

(22) PCT Filed: Apr. 13, 2021

(86) PCT No.: PCT/JP2021/015788
§ 371 (c)(1),
(2) Date: Oct. 13, 2022

(87) PCT Pub. No.: WO2021/246063
PCT Pub. Date: Sep. 12, 2021

(65) Prior Publication Data
US 2023/0141700 A1    May 11, 2023

(30) Foreign Application Priority Data
Jun. 5, 2020 (EP) .................................... 20305605

(51) Int. Cl.
*G01S 5/02* (2010.01)
*B61L 25/02* (2006.01)
(Continued)

(52) U.S. Cl.
CPC .......... *G01S 5/0215* (2013.01); *B61L 25/025* (2013.01); *B61L 27/20* (2022.01); *G01S 5/0249* (2020.05);
(Continued)

(58) Field of Classification Search
CPC ..... H04W 24/08; H04W 28/04; H04W 72/51; H04W 72/541; H04W 84/005;
(Continued)

(56) References Cited

U.S. PATENT DOCUMENTS 9,992,778 B2 * 6/2018 Brunel ................. H04W 72/51
10,305,649 B2 * 5/2019 Fang .................... H04W 72/541
(Continued)

FOREIGN PATENT DOCUMENTS

CN    113562031 A * 10/2021
JP    2008-524961 A    7/2008
(Continued)

OTHER PUBLICATIONS

Japanese Office Action for Japanese Application No. 2022-578018, dated May 23, 2023, with an English translation.

*Primary Examiner* — Matthew C Sams
(74) *Attorney, Agent, or Firm* — Birch, Stewart, Kolasch & Birch, LLP

(57) ABSTRACT

A method for geolocating an interference source in a communication-based transport system, wherein the communication-based transport system comprises: —a plurality of interference sources, distributed in a space and respectively emitting signal, —a vehicle, moving along a known trajectory, receiving the signal from the interference sources, and measuring the signal strength of the signal of only one interference source at a time instance; the method comprising: —separating the interference sources by clustering the signal strength of the signal with a clustering method; —estimating the locations of the interference sources in the space based on the separated interference sources.

15 Claims, 4 Drawing Sheets

(51) Int. Cl.
    *B61L 27/20*     (2022.01)
    *H04B 1/10*     (2006.01)

(52) U.S. Cl.
    CPC ...... *H04B 1/1027* (2013.01); *B61L 2027/204* (2022.01)

(58) Field of Classification Search
    CPC ... H04L 5/0042; H04L 5/0069; H04B 17/345; H04B 1/1027; G01S 5/0215; G01S 5/0249; B61L 27/20; B61L 25/025; B61L 2027/204
    See application file for complete search history.

(56) References Cited

U.S. PATENT DOCUMENTS

| | | |
|---|---|---|
| 10,893,416 B2 | 1/2021 | Gresset |
| 2006/0133543 A1 | 6/2006 | Linsky et al. |
| 2015/0163817 A1* | 6/2015 | Brunel .................. H04W 24/08 370/329 |
| 2016/0285602 A1* | 9/2016 | Fang ..................... H04L 5/0032 |
| 2017/0195832 A1 | 7/2017 | Santiago et al. |
| 2021/0168820 A1* | 6/2021 | Hashimoto .......... H04W 72/541 |
| 2021/0288731 A1* | 9/2021 | Yun ...................... H04B 17/318 |
| 2023/0141700 A1* | 5/2023 | Nguyen ............. B61L 15/0027 455/456.1 |

FOREIGN PATENT DOCUMENTS

| | | | | |
|---|---|---|---|---|
| JP | 2017-122724 A | 7/2017 | | |
| JP | 2018-508418 A | 3/2018 | | |
| JP | 2019-503109 A | 1/2019 | | |
| WO | WO-03063532 A1 * | 7/2003 | ........... | H04W 24/00 |
| WO | WO 2016/118672 A2 | 7/2018 | | |

\* cited by examiner

```
input:  Z = [Z_1,...,Z_n,...,Z_N]
output: θ = [θ_1,...,θ_k,...,θ_K]
    Initialization: θ^(0) = random
    For each i:
    ▪ Compute μ^(i) from θ^(i-1)
    ▪ Update V^(i) as
```

$$V^{(i)} = \arg\min_{V} \sum_{n=1}^{N} \left| Z_n - \sum_{k=1}^{K} \mu_{n;k} \delta(V_n) \right|^2$$

```
    ▪ Update θ^(i) as
```

$$\theta_k^{(i)} = \arg\max_{\theta_k} \mathcal{L}(Z, V^{(i)})$$

```
    Until ‖θ^(i) - θ^(i-1)‖ < ε

(the function L(Z, V^(i)) is the likelihood)
```

FIG. 3

```
input:  Z = [Z_1,...,Z_n,...,Z_N]
output: θ = [θ_1,...,θ_k,...,θ_K]
```

Initialization: the discretized space of $\theta_k$: $\mathfrak{I}$, $T = \|\mathfrak{I}\|$, then set $P(\theta_k | Z_{0;k}) = \frac{1}{T}$ for any $\forall \theta_k \in \mathfrak{I}$   $P(V_n | V_{1:n-1}, Z_{1:n-1}) = \frac{1}{K}, \forall n = 1..N.$

For each $n$ in (1..N) do
  calculate $P(Z_{n;k} | Z_{1:n-1;k}, \theta_k)$ with mean and variance as in (10)
  calculate $P(Z_{n;k} | Z_{1:n-1;k})$ as in (9)
  calculate $P(V_n | V_{1:n-1}, Z_{1:n})$ as in (8)
  make clustering decision as in (11)
  update $P(\theta_k | Z_{1:n;k})$ as in (12)
MAP estimating as in (13)

FIG. 4 input: $\mathbf{Z} = [Z_1, ..., Z_n, ..., Z_N]$
output: $\mathbf{\theta} = [\theta_1, ..., \theta_k, ..., \theta_K]$
    Initialization:
        split $\mathbf{Z}$ into $M$ samples
        discretize space of $\theta_k$ as $\Im$, $T = \|\Im\|$, then set $P(\theta_k | Z_{0;k}) = \frac{1}{T}$ for any $\forall \theta_k \in \Im$.

set $P(V_n | V_{1:n-1}, Z_{1:n-1}) = \frac{1}{K}, \forall n = 1..N$.

For each $m$ in (1..M) do
        For each $Z_n$ in sample $m$ do
            calculate $P(Z_{n;k} | Z_{1:n-1;k}, \theta_k)$ with mean and variance as in (10)
            calculate $P(Z_{n;k} | Z_{1:n-1;k})$ as in (9)
            calculate $P(V_n | V_{1:n-1}, Z_{1:n})$ as in (8)
            make clustering decision as in (11)
            update $P(\theta_k | Z_{1:n;k})$ as in (12)
        eliminate $\theta_k$ if $P(\theta_k | Z_{1:n;k}) \leq \epsilon$
        refine the discretization for remaining $\theta_k$
        MAP estimating as in (13)

FIG. 5

METHOD FOR GEOLOCATING INTERFERENCE SOURCE IN COMMUNICATION-BASED TRANSPORT SYSTEM

TECHNICAL FIELD

The present invention relates to the field of geolocation, especially relates to geolocating an interference source in a communication based transport system.

BACKGROUND ART

A communication based transport system is a signaling system that makes use of the telecommunications between the vehicles (including trains, cars, boat and etc.) and track equipment for the traffic management and infrastructure control. A typical communication based transport system is a communications-based train control (CBTC), wherein the exact position of a train is accurately known based on a wireless network. This results in a more efficient and safe way to manage the railway traffic, so as to achieve maximum capacity and minimum headway between operating vehicles (trains), while maintaining the safety requirements.

However, in the CBTC system, the communication between train and waysides operates in public frequency band. For this reason, the wireless signal used in the system suffers from the interference caused by other devices which use Wi-Fi, Bluetooth, and others. In order to monitor the radio quality or manage the radio resource, the knowledge on interference source is essential. In some studies, it is discussed how to tackle the identification problem of interference source in the frequency domain. Whereas, it is still need to identify the interference source in the spatial domain. In other words, it is necessary to analyse the geographical property of the interference source in the system.

In the art, few solutions have been proposed to solve such a problem of an accurate geolocation of interference source by only using existing radio module in the vehicle in the system.

SUMMARY OF INVENTION

In this regard, according to one aspect of the invention, it is provided a method for geolocating an interference source in a communication-based transport system, wherein the communication-based transport system comprises:
 a plurality of interference sources, distributed in a space and respectively emitting signal,
 a vehicle, moving along a known trajectory, receiving the signal from the interference sources, and measuring the signal strength of the signal of only one interference source at a time instance.
The method comprises:
 separating the interference sources by clustering the measured signal strength of the signal with a clustering method;
 estimating the locations of the interference sources in the space based on the separated interference sources.

With such an arrangement, the present invention may identify the interference position based on power measurement without adding any complication to the current system radio hardware.

In an embodiment, the communication-based transport system is a Communications-based train control (CBTC) system, and the vehicle is a train. Alternatively, the communication-based transport system can also be the one used for car, boat and etc. where the vehicle is travelling along a known trajectory and receive wireless radio signals for the traffic management.

In addition, the known trajectory, for example, comprises known position, velocity and direction of the at least one vehicle.

Moreover, it is preferable that only one interference source emits the signal, so as to avoid collision between the interference sources. Alternatively, the interference sources are randomly activated.

Preferably, the system uses and the interference sources emit signal using CSMA/CA or CSMA/CD protocols, whereas other telecommunication protocols can also be used.

Alternatively, the step of separating the interference sources and the step of estimating the location of the interference sources are iteratively applied. As an example, the step of separating the interference sources uses K-mean clustering method, and the step of estimating the location of the interference sources uses maximum-likelihood estimation.

Alternatively, the step of separating the interference sources and the step of estimating the location of the interference sources are sequentially applied. As an example, wherein the step of separating the interference sources uses joint Bayesian clustering method, and the step of estimating the location of the interference sources uses Maximum-A-Posteriori (MAP) estimation.

When sequential method is applied, the step of separating the interference sources is progressively applied from a previous known knowledge of an interference source.

In this case, by using the sequential method, the method according to the invention may further comprise:
 geometrically dividing the measurements of the signal strength into successive clusters;
 estimating the locations of the interference sources in one cluster;
 exploiting the estimated locations of the interference sources in the cluster as the prior knowledge to another cluster in the successive clusters; and
 filtering significant interference sources from a neighbor to another.

In this regard, it is possible to reduce computational complexity while still obtaining precise geolocation in one travel.

Alternatively, by using the sequential method, for the situation where the vehicle has a plurality of travels along the known trajectory, the method according to the invention may also comprises:
 estimating the locations of the interference sources in one travel;
 exploiting the estimated locations of the interference sources in the travel as the prior knowledge to other travels.

In this regard, it is possible to use the estimated locations of the interference sources in one travel for the estimation of the locations of the interference sources in other travels.

According to another aspect of the invention, it is further provided a communication-based transport system for geolocating an interference source, wherein the communication-based transport system comprises:
 a plurality of interference sources (K), distributed in a space and respectively emitting signal,
 a vehicle, moving along a known trajectory and having a radio module, which is capable of receiving the signal from the interference sources and measuring the signal strength of the signal of only one interference source at a time instance;

a controller, configured to:

separate the interference sources by means of the measured signal strength of the signal;

estimate the location of the interference sources in the space by means of the separated interference sources.

According to yet another aspect of the invention, it is further provided a computer program comprising program code to be executed by a processor, the program code being adapted to performance of the abovementioned method according to the present invention when executed by the processor.

In this case, the present invention solves the problem of identifying spatially the interference by only using the existing radio module on the train. In other words, the CBTC's radio measures the interference power then based on the distance-power relation and the moving-sampling mechanic, one can geo-locate the interferers. However, the challenge is to estimate the randomness of interference as well as the mixture behaviour among them.

Other features and advantages of the present invention will appear in the description hereinafter, in reference to the appended drawings.

BRIEF DESCRIPTION OF DRAWINGS

FIG. 3 shows an example of a pseudo code for describing K-mean clustering algorithm.

FIG. 4 shows an example of a pseudo code for describing a first solution according to the present invention.

FIG. 5 shows an example of a pseudo code for describing a second solution according to the present invention.

DESCRIPTION OF EMBODIMENTS

Figure 1:
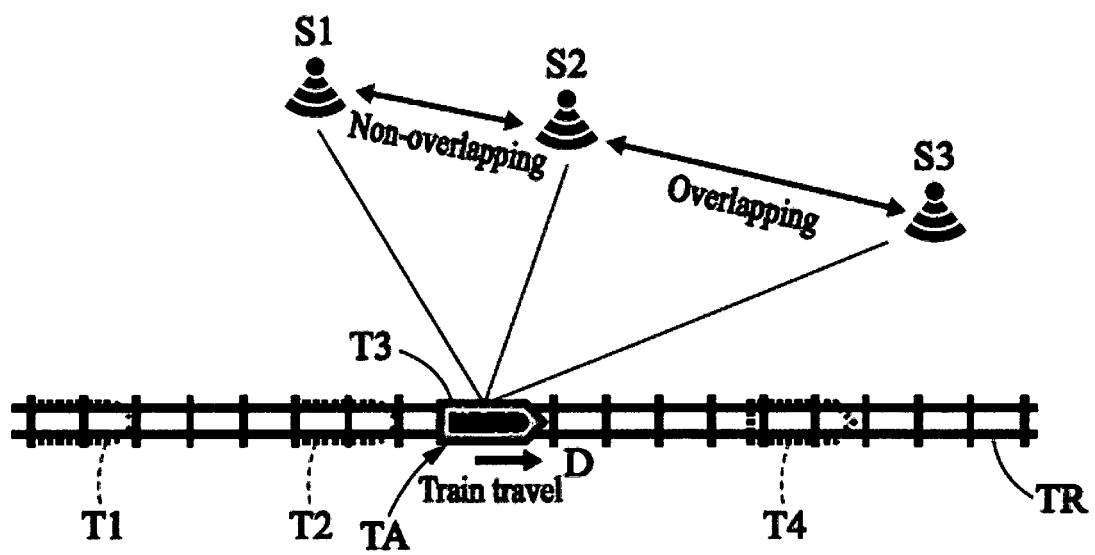
FIG. 1 illustrates an exemplary communication-based train system according to the present invention.

FIG. 1 shows an exemplary communication-based train system according to the present invention. In this exemplary system, a train TA is travelling long a track TR at a speed of v m/s in direction D, passing different positions, such as positions T1, T2, T3, T4 on the track TR. In the system, there are also several interference sources, such as S1, S2, and S3 show in FIG. 1, which emit interference signals and thus need to be geographically identified so as to avoid the signal interferences for these sources.

In the system, the train TA has a radio that can receive and measure signal, for example emitted by the interference signals during its moving at a rate R times per second. The path loss in dB is a+b·log d, where d is the receiver and transmitter (Tx–Rx) distance, a and b denote the path loss coefficients. In addition, shadowing between two different positions, such as positions T1 and T2, correlates with a coefficient as: p_0 e^(−(|Δx|)/d_c), where d_c and ρ_0 denote the shadowing coefficients and Δx is the train position difference.

The interference sources S1, S2 and S3 are in different locations, randomly interfering the train's radio. In the present invention, from one measurement to another, the interference sources are randomly activated. As an example, CSMA/CA is used in the present invention, and it is performed among interference sources close to each other, and therefore a non-contention condition is satisfied.

In this case, in this embodiment, the measurement belongs to only one source at one moment. However, the interference sources may randomly switch one to another which makes the observation a mixed signal. In addition, the interference appearance is also random due to the data traffic model. Therefore, the present invention solves the geolocation problem by two main steps as follows:

Source separation: Since an observation can randomly belong to one of interference sources, one needs to identify interference source to which measurements belong.

Position estimation: Once the observations are separated, the interference sources' positions could be estimated and thus geolocalized.

These two steps are jointly dependent, the solution of one affects the other.

Figure 2:
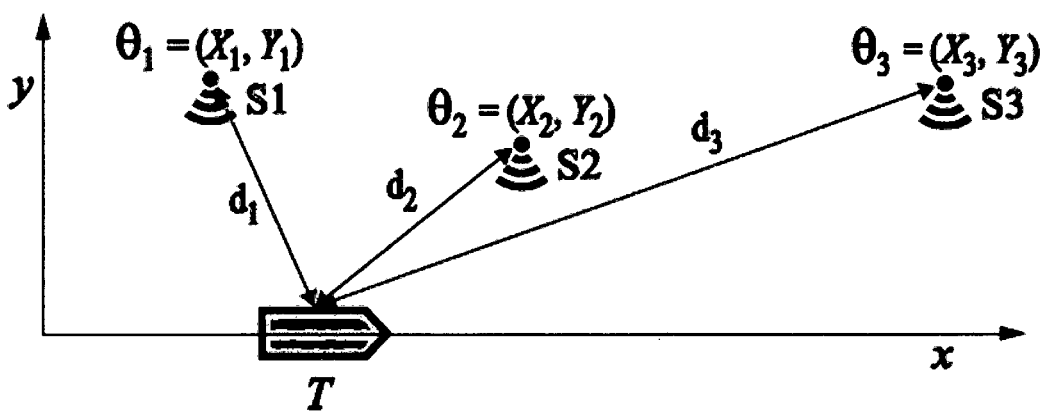
FIG. 2 illustrates an exemplary local coordinate system of the communication-based train system according to the present invention.

FIG. 2 shows a local 2D coordinate system of the above exemplary embodiment of the system according to the present invention, which has x-axis and y-axis, wherein the interference sources S1, S2, S3 . . . have their positions $\theta=[\theta_1, \theta_2, \ldots, \theta_K]$ with their coordinates $[(X_1, Y_1) (X_2, Y_2) \ldots (X_K, Y_K)]$, i.e $\theta=[\theta_1, \theta_2, \ldots, \theta_K]=[(X_1, Y_1) (X_2, Y_2) \ldots (X_K, Y_K)]$ which are the output of the present invention. In addition, in the coordinate system, the train's positions on its track along x-axis are denoted as T, and $T=[T_1, \ldots, T_n, \ldots, T_N]$. Moreover, the distances between the interference sources and the train is denoted as d1, d2, d3 . . . in FIG. 2. It should be noted the coordinate system is merely for the purpose of illustration, other formats, such 1D or 3D, may also be applied.

In the context of the present invention, the following parameters are also defined:

The train's radio measures the interference power as $Z=[Z_1, \ldots, Z_n, \ldots, Z_N]$ Defining a latent variable $V=[V_1, \ldots, V_n, \ldots, V_N]$ that indicates which interference source is transmitting at each instant. This is not essential, but it is convenient for proceed with the method to be discussed following paragraphs.

Discretizing the space of $\theta$ as $\mathfrak{S}$. In the present invention, a discrete set of positions is used to numerically implement the method according to the invention.

Defining the position-measurement dependence for all $\theta$ in $\mathfrak{S}$ $$Z_n=\mu_n+w_n,$$

where $\mu_n$ is obtained from $T_n$ and $\theta$ thanks to a predefined function, such as $\mu_n=a+b \log \|T_n-\theta\|$; and where $w_n$ is an observation noise (due to shadowing in the propagation channel).

Optionally defining the measurements' correlation of an interference source $$(Z_n, Z_m) \sim N(\mu, \Sigma),$$

$$\text{where } \mu = [\mu_n \mu_m]^T, \Sigma = \sigma^2 \begin{pmatrix} 1 & e^{-\frac{\|T_m-T_n\|}{d_c}} \\ e^{-\frac{\|T_m-T_n\|}{d_c}} & 1 \end{pmatrix}.$$

This correlation is mainly due to the shadowing correlation between the two considered positions $T_m$ and $T_n$ of the moving device. The shadowing is usually Gaussian in the log domain. This is optional since the correlation probably does not exist in some systems.

As mentioned, the present invention involves two main steps, i.e. source separation and Position estimation. As an example, two exemplary mathematical approaches are proposed as follows:

Iterative method: This approach operates iteratively to implement the two steps in the following manners:
Source separation: K-mean clustering method is applied. V is calculated by minimizing the distance from measurements to means.
Position estimation: by having the classifying vector V, the interferers' position θ can be obtained by maximum-likelihood estimation.
Sequential method: by using the Bayesian inference, the source separation is progressively solved by one measurement after another. Then the Maximum-A-Posteriori (MAP) estimation is employed to have the interference source's position.

These two approaches will be further discussed in the following paragraphs. Before that, a model to implement the two main steps is established as follows:

Non-overlapping condition: in the embodiment, it is supposed that there is not the collision between interference sources. That means at a time moment, only one interference source emits signal. This condition can be satisfied by using CSMA/CA protocol or CSMA/CD for example.
Known train trajectory: at any moment, the train knows its position as well as its velocity and direction.
A local coordinate system is applied as the one shown in FIG. 2.
Distance between train and interference source k, at time n:

$$d_{n;k}^2 = \|T_n - \theta_k\|^2 \quad (1)$$

Interference received power on the train if the interference source k is active at time n $$Z_n = a + b \log d_{n;k} + w_{n;k}, \quad (2)$$

where a and b are two coefficients of path-loss model and $w_{n;k}$ denotes the shadow fading on the train with respect to interferer k, at time n.

The shadow fading follows the multivariate Gaussian distribution with the correlation between two train positions $T_n$ and $T_m$ is expressed as $$\rho = \rho_0 e^{-\frac{\|T_n - T_m\|}{d_c}}, \quad (3)$$

where $d_c$, $\rho_o$ are coefficients of shadowing model (also known).

The path-loss and shadowing model are assumed to be known.

It is assumed that there are K interference sources, therefore the parameters to be estimated are their positions:

$$\theta = [\theta_1, \ldots, \theta_k, \ldots, \theta_K]. \quad (4)$$

On the train, the radio module measures the power level of interference from time instant 1 to N, the observation vector can be written as $$Z = [Z_1, \ldots, Z_n, \ldots, Z_N]. \quad (5)$$

In the present invention, it is not known which one among K interferers is active at any time instant. In this sense, the observation is mixed among sources. Considering non-overlapping condition, it is assumed that at a time instant there is only one source is emitting. In other words, when the train measures a signal, this signal belongs to only one interferer. This is to avoid a more complex case where multiple interference sources emit signal at the same time and when the train measures, it measures the combination of these signals.

the following latent variable is introduced, so as to indicate which source is activated at time n.

$$V = [V_1, \ldots, V_n, \ldots, V_N],$$

Based on this model, the two approaches, i.e. iterative method and sequential method, are now discussed.

Iterative method: K-mean clustering+Maximum likelihood position estimation

In order to separate the interference sources, K-mean clustering algorithm is applied as a simple and efficient method. Since the path-loss model is available, the received power from the source k when the train is at $T_n$, is centered at $\mu_{n;k} = a + b \log d_{n;k}$. K-mean algorithm aims to minimize the distance between the observation and the mean point, which is expressed as $$V_{K-mean} = \arg\min_V \sum_{n=1}^{N} \left| Z_n - \sum_{k=1}^{K} \mu_{n;k} \delta(V_n) \right|^2. \quad (6)$$

The K-mean clustering algorithm can be described by the pseudo code shown in FIG. 3.

Sequential method: Joint Bayesian clustering and position estimation

In the sequential method, at time instant n, one need to identify which source is emitting based on the result of n−1 previous estimation. Due to this end, the Bayesian approach is expressed as $$P(V_n | V_{1:n-1}, Z_{1:n}) = \frac{P(Z_n | V_{1:n-1}, Z_{1:n-1}, V_n) P(V_n | V_{1:n-1}, Z_{1:n-1})}{\sum_{V_n} P(Z_n | V_{1:n-1}, Z_{1:n-1}, V_n) P(V_n | V_{1:n-1}, Z_{1:n-1})} \quad (7)$$

Without any knowledge on the prior $P(V_n | V_{1:n-1}, Z_{1:n-1})$ of time instant n, we assume it follows a uniform distribution. The likelihood $P(Z_n | Z_{1:n-1}, Z_{1:n-1}, V_n)$ is computed for each possibility of $V_n$ as follows $$P(Z_n | V_{1:n-1}, Z_{1:n-1}, V_n = k) = \quad (8)$$
$$P(Z_{n;k} | Z_{1:n-1;k}) = \sum_{\theta_k} P(Z_{n;k} | Z_{1:n-1;k}, \theta_k) P(\theta_k | Z_{1:n-1;k})$$

This expression is resulted by saying that once one knows at instant n the $k^{th}$ source is interfering, the likelihood of observation $Z_n$ depends only on the previous observations that are assigned to $k^{th}$ source. As seen in the shadowing model, $Z_{1:n;k}$ is a multivariate Gaussian random variable, therefore the conditional probability $P(Z_{n;k} | Z_{1:n-1;k}; \theta_k)$ is a Gaussian with mean and variable are expressed as $$\begin{cases} \mu_{n|1:n-1;k} = \mu_{n;k} + \sum_{n|1:n-1;k} \sum_{1:n-1;k}^{-1} (Z_{1:n-1;k} - \mu_{1:n-1;k}) \\ \sigma_{n|1:n-1;k} = \sigma - \sum_{n|1:n-1;k} \sum_{1:n-1;k}^{-1} \sum_{1:n-1|n;k} \end{cases} \quad (9)$$

where $\mu_{n;k}$ denotes the mean at time n of source k,
$\Sigma_{n|1:n-1;k}$ denotes the correlation matrix between time n and time 1:n−1 of source k,
$\Sigma_{1:n-1;k}$ denotes the auto-correlation matrix of time 1:n−1 of source k,
$\mu_{1:n-1;k}$ denotes the mean at time 1:n−1 of source k,
$\Sigma_{1:n-1|n;k}$ denotes the correlation matrix between time 1:n−1 and time n of source k.

Clustering decision is expressed as:

$$V_n = \underset{(1,2,\ldots K)}{\mathrm{argmax}} P(V_n \mid V_{1:n-1}, Z_{1:n}) \qquad (10)$$

Posterior at time instance n is calculated as:

$$P(\theta_k \mid Z_{1:n;k}) = \frac{P(Z_{n;k} \mid Z_{1:n-1;k}, \theta_k) P(\theta_k \mid Z_{1:n-1;k})}{P(Z_{n;k} \mid Z_{1:n-1;k})}. \qquad (11)$$

This posterior acts like the prior for the next instant n+1, and the very first prior $P(\theta_k|Z_{0;k})$ is supposed to be uniform.

In the last observation, sources' position are estimated by the maximum a posteriori (MAP) estimator as $$\hat{\theta}_k = \underset{\theta_k}{\mathrm{argmax}} P(\theta_k \mid Z_{1:N;k}) \qquad (12)$$

On the bases of this algorithm, the following two solutions can be numerically implemented:

Solution 1

To numerically implement the aforementioned algorithm, the θ's space is discretized.

The first solution is to process all N observations at once. In this situation, the discretization needs to be fine for obtaining a good precision. Therefore, high computational complexity and memory are required.

In particular, this first solution can be described by the pseudo code shown in FIG. 4.

Solution 2:

Alternatively, when using the sequential approach, data do not need to be processed at once. Indeed it is possible to split data into smaller samples, loosen the discretization then enhance the precision progressively with the sequential clustering. This method is more adaptive for the algorithm in the subsection a) in the sense that it maintains a good precision while guaranteeing a low complexity. Thus, in terms of scalability, partitioning data is more suitable if further we want to take more observations into account.

This second solution can be described by the pseudo code shown in FIG. 5.

Figure 6:
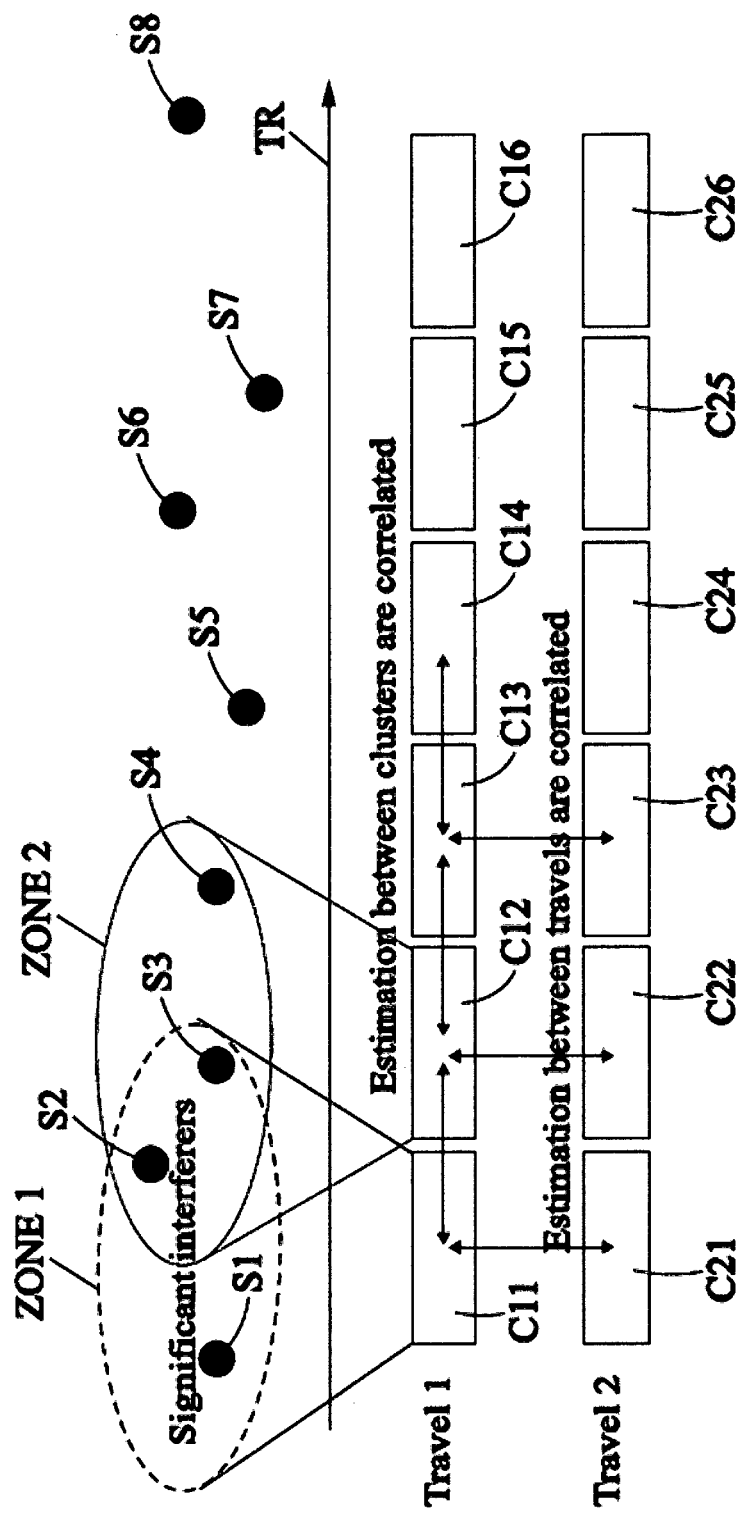
FIG. 6 illustrates clusters and travels correlated in the sequential method of an exemplary embodiment according to the present invention.

Furthermore, these approaches in the sequential method enable the possibility to take into account a prior knowledge on interference sources' position from other train travels or from a database, as shown in FIG. 6, where there are two train Travels 1 and 2 along the track TR suffering the interferences from the same interferences sources S1, S2, S3 . . . S8. In the beginning, if the knowledge on the interference sources is not available, a uniform probability will be imposed. Once the knowledge of train travel is given, the following two data process possibilities are considered:

1. Batch-wise: All data is processed once and the output is the posteriori probability of θ. This posterior acts like the prior for other travels.

2. Data partitioning: The measurements can be geometrically divided into successive clusters, such as C11 . . . C16 in Travel 1 and C21 . . . C26 in Travel 2. Then the posterior of previous cluster is seen as the prior of current one, for example C11 is prior of C12, C12 is prior of C13. This approach allows the down-selection of θ in the following two ways in order to reduce the computational complexity while maintaining the accuracy:

a. Some θ with an insignificant prior probability will be eliminated. The remaining set is more finely quantized.

b. By knowing the distance-dependence of measurements, one can determine a zone of significant interferers for a cluster. For example, as shown in FIG. 6, zone 1 is determined for the cluster C11 and covers significant interference sources S1, S2 and S3, and zone 2 is determined for the cluster C12 and covers significant interference sources S2, S3, and S4. From this information, some θ in the prior that lay outside this zone, can be eliminated, for example, in zone 2, the interference source S1 is eliminated.

Therefore, instead of collecting all measurements of all positions for several train travels and process them as a whole, it is preferable to find an implementation that allows to update frequently the estimation of the interference sources' position.

It aims to make use the estimation of interference sources of a cluster. This estimation is correlated from one cluster to the next, thus, the result of the estimation for one cluster C11 can be useful for the next cluster C12, and so on in one travel, as illustrated in FIG. 6. Equivalently, for multiple travels, when processing the observations associated to a cluster C22 of a second train travel, Travel 2, both the information of the previous cluster C21 (updated during the current train travel) and the estimations already done in previous train travel, Travel 1, for the current and previous clusters C11, C12 are useful as prior information for the estimation.

In a word, in the abovementioned exemplary communications-based train control system, the radio on the train observes the channel and measures the power level of interference from interference sources at each position while the train is traveling along a known trajectory, wherein the interference strength depends on the train-interferer distance, and thus the moving train allows geometrically sampling the signal strength of interferences, hence allows estimating the position of interference sources.

In this regard, the present invention may estimate the spatial characteristic of interference sources in a communication-based transport system based only on the power measurement of the radio hardware in the system, so as to geolocalize the interference sources, without adding any complication to the current radio hardware in the system.

Moreover, it is known to those skilled in the art, the aforementioned exemplary solutions according to the present invention can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

The embodiments described hereinabove are illustrations of this invention. Various modifications can be made to them without leaving the scope of the invention which stems from the annexed claims.

The invention claimed is:

1. A method for geolocating an interference source in a communication-based transport system, wherein the communication-based transport system comprises:
   a plurality of interference sources, distributed in a space and respectively emitting signal,
   a vehicle, moving along a known trajectory, receiving the signal from the interference sources, and measuring the signal strength of the signal of only one interference source at a time instance;
   the method comprising:
   separating the interference sources by clustering the signal strength of the signal with a clustering method;
   estimating the locations of the interference sources in the space based on the separated interference sources.

2. The method according to claim 1, wherein the communication-based transport system is a communications-based train control system, and the vehicle is a train.

3. The method according to claim 1, wherein the known trajectory comprises known position, velocity and direction of the at least one vehicle.

4. The method according to claim 1, wherein at any time instance, only one interference source emits the signal, so as to avoid collision between the interference sources.

5. The method according to claim 1, wherein the interference sources emit signal using CSMA/CA or CSMA/CD protocols.

6. The method according to claim 1, wherein the interference sources are randomly activated.

7. The method according to claim 1, wherein separating the interference sources and estimating the location of the interference sources are iteratively applied.

8. The method according to claim 7, wherein separating the interference sources uses K-mean clustering method, and estimating the location of the interference sources uses maximum-likelihood estimation.

9. The method according to claim 1, wherein separating the interference sources and estimating the location of the interference sources are sequentially applied.

10. The method according to claim 9, wherein separating the interference sources uses joint Bayesian clustering method, and estimating the location of the interference sources uses Maximum-A-Posteriori (MAP) estimation.

11. The method according to claim 10, wherein separating the interference sources is progressively applied from a previous known knowledge of an interference source.

12. The method according to claim 11, wherein the method further comprising:
   geometrically dividing the measurements of the signal strength into successive clusters;
   estimating the locations of the interference sources in one cluster;
   exploiting the estimated locations of the interference sources in the cluster as the prior knowledge to another cluster in the successive clusters; and
   filtering significant interference sources from a neighbour to another.

13. The method according to claim 11, wherein the vehicle has a plurality of travels along the known trajectory, and the method further comprises:
   estimating the locations of the interference sources in one travel;
   exploiting the estimated locations of the interference sources in the travel as the prior knowledge to other travels.

14. A communication-based transport system for geolocating an interference source, wherein the communication-based transport system comprises:
   a plurality of interference sources, distributed in a space and respectively emitting signal,
   a vehicle, moving along a known trajectory and having a radio module, which is capable of receiving the signal from the interference sources and measuring the signal strength of the signal of only one interference source at a time instance;
   a controller, configured to:
   separate the interference sources by clustering the measured signal strength of the signal with clustering method;
   estimate the location of the interference sources in the space by the separated interference sources.

15. A non-transitory computer readable medium storing a computer program comprising program code to be executed by a processor, the program code being adapted to performance of a method as claimed in claim 1 when executed by the processor.

* * * * *